US010008134B2

(12) United States Patent
Pura et al.

(10) Patent No.: US 10,008,134 B2
(45) Date of Patent: Jun. 26, 2018

(54) OUTDOOR SIGN SYSTEM AND A METHOD OF USING THE SAME

(71) Applicant: BLACK HORN INDUSTRIES CORP., Thorhild, OT (CA)

(72) Inventors: Scott Pura, Thorhild (CA); Nicholas Pura, Edmonton (CA); Chris Cropley, Drayton Valley (CA)

(73) Assignee: Black Horn Industries Corp., Thorhild, Alberta (CA)

( * ) Notice: Subject to any disclaimer, the term of this patent is extended or adjusted under 35 U.S.C. 154(b) by 0 days. days.

(21) Appl. No.: 15/352,201

(22) Filed: Nov. 15, 2016

(65) Prior Publication Data

US 2018/0137790 A1 May 17, 2018

(51) Int. Cl.

| | |
|---|---|
| ***F16M 13/00*** | (2006.01) |
| ***G09F 7/22*** | (2006.01) |
| ***E04H 12/22*** | (2006.01) |
| *G09F 7/18* | (2006.01) |

(52) U.S. Cl.

CPC ........... *G09F 7/22* (2013.01); *E04H 12/2238* (2013.01); *G09F 2007/1856* (2013.01)

(58) Field of Classification Search

USPC .......................................................... 248/530

See application file for complete search history.

(56) References Cited

U.S. PATENT DOCUMENTS

| | | | | | |
|---|---|---|---|---|---|
| 598,003 | A * | 1/1898 | Oliver | E04H 12/2223 | 52/154 |
| 891,448 | A * | 6/1908 | Snider | E02D 5/801 | 52/157 |
| 3,554,306 | A * | 1/1971 | Wilburn | E21B 10/38 | 175/320 |
| 4,162,789 | A * | 7/1979 | Hollaway | A63B 69/0013 | 33/755 |
| 4,920,897 | A * | 5/1990 | Reed | A47B 37/04 | 108/150 |
| 5,358,209 | A * | 10/1994 | Ward | E04H 12/2223 | 248/530 |
| 5,457,918 | A * | 10/1995 | Plourde | E04H 12/2223 | 248/545 |
| 5,662,304 | A * | 9/1997 | McDaniel | E04H 12/2223 | 248/499 |
| 8,235,347 | B2 * | 8/2012 | Austin, III | A47G 29/1216 | 248/156 |
| 9,464,397 | B1 * | 10/2016 | Abraham | E02D 5/801 | |

(Continued)

*Primary Examiner* — Monica E Millner

(74) *Attorney, Agent, or Firm* — Sand & Sebolt

(57) ABSTRACT

A sign system and method for temporarily displaying signs. The sign system includes a mounting assembly, a pole and a sign. The mounting assembly is installed in the ground; the pole is engaged with the mounting assembly and the sign is engaged with the pole. The mounting assembly includes a flange with upper and lower surfaces; a base engaged with the upper surface and extending outwardly therefrom in a first direction; and a screw engaged with the lower surface of the flange and extending outwardly therefrom in a second direction. The flange is oriented at right angles to a longitudinal axis of the screw. When the screw is rotated into the ground the flange contacts the ground surface and limits the depth to which the screw may rotate. Additionally, the screw may be of a preset length to additionally control the depth of penetration of the screw into the ground.

19 Claims, 19 Drawing Sheets

(56) References Cited

U.S. PATENT DOCUMENTS

| | | | | |
|---|---|---|---|---|
| 2007/0120035 | A1* | 5/2007 | Albanese | E04H 12/2223<br>248/530 |
| 2008/0008555 | A1* | 1/2008 | Ardern | E04H 12/2223<br>411/411 |

* cited by examiner

OUTDOOR SIGN SYSTEM AND A METHOD OF USING THE SAME

BACKGROUND

Technical Field

Generally, the current disclosure relates to a display sign system. Particularly, the current disclosure relates to a sign system that is useful on construction sites for temporarily displaying information. More particularly, the current disclosure relates to an outdoor sign system and method of use where the sign system includes a mounting assembly configured to penetrate the ground to a maximum preset depth and to support a pole upon which an informational sign may be secured.

Background Information

There are many types of temporary outdoor signs and markers that are supported by placing the lower end a couple of feet into the ground. In some applications, such as the gas and petroleum industries, there is a need for poles and/or signs that may be inserted into the ground. However, an issue exists with currently known systems in that it is extremely difficult to control the depth to which such pole and signs penetrate the ground. It is not uncommon for gas lines and pipes to be located as close as 15" below the ground's surface. If an installer is not extremely careful, they may accidentally puncture such gas lines and pipes as they erect the pole or sign. Installing poles and signs into the ground may not be an easy job to accomplish if the ground is quite hard. Because penetration into hard ground requires extra effort, a hammer or a similar tool may need to be used to knock the pole into place. However, it is difficult to control the depth of penetration of the pole when hammering the top thereof and this may result in accidental interference with buried pipes and electric cables. If a pole penetrates an oil pipe for example, oil may spill from the pipe and contaminated the soil. If a pole penetrates an electric line or communication cable, there may be electrical outrage or internet disconnection.

SUMMARY

There remains a need in the art for an improved means and method for temporarily installing pipes and signs in locations such as construction sites where the means reduces the likelihood of penetration of underground pipes or electric lines. The presently disclosed mounting assembly and sign system incorporating the mounting assembly addresses some of the issues described above. The terms "sign" and "sign system" used herein should be understood to include poles, poles having informational signs mounted thereon or any other similar component that may need to be installed at a depth into the ground and subsequently be retained generally vertically with respect to the ground.

A sign system and method for temporarily displaying signs is disclosed. The sign system includes a mounting assembly, a pole and a sign. The mounting assembly is installed in the ground; the pole is engaged with the mounting assembly and the sign is engaged with the pole. The mounting assembly includes a flange with upper and lower surfaces; a base engaged with the upper surface and extending outwardly therefrom in a first direction; and a screw engaged with the lower surface of the flange and extending outwardly therefrom in a second direction. The flange is oriented at right angles to a longitudinal axis of the screw. When the screw is rotated into the ground the flange contacts the ground surface and limits the depth to which the screw may rotate. Additionally, the screw may be of a preset length to additionally control the depth of penetration of the screw into the ground.

In one aspect, an embodiment of the present disclosure may provide a mounting assembly for quickly deploying signs in the ground comprising a flange having an upper surface and a lower surface; a base engaged with the upper surface and extending outwardly therefrom in a first direction; and a screw engaged with the lower surface of the flange and extending outwardly therefrom in a second direction, wherein the screw has a length defined from the lower surface of the flange to a tip of the screw.

In another aspect, an embodiment of the present disclosure may provide a mounting assembly for quickly deploying poles in the ground, comprising a first flange having a first surface and a second surface; a screw extending outwardly from the second surface of the flange; and a bending module, wherein the bending module comprises a base; a coil spring having a first end and a second end; a second flange; wherein the first end of the coil spring engages the base and the second end of the coil spring engages the second flange; and wherein a connector secures the first flange and the second flange together.

In another aspect, an embodiment of the present disclosure may provide a method of deploying a sign system into the ground, comprising providing a mounting assembly comprising a flange having an upper surface and a lower surface; a base engaged with the upper surface and extending outwardly therefrom in a first direction; and a screw engaged with the lower surface of the flange and extending outwardly therefrom in a second direction; rotating the screw into the ground; and limiting a depth to which the screw rotates into the ground. The step of providing the mounting assembly may comprise orienting the flange at right angles relative to a longitudinal axis of the screw; and the step of limiting the depth to which the screw rotates into the ground may comprise contacting the ground with the flange. The step of providing the mounting assembly may comprise providing the screw of a length that is about 12 inches when measured from the lower surface of the flange to a tip of the screw.

In another aspect the invention may provide a method of deploying a mounting assembly into the ground, comprising providing a first flange having a first surface with a first ring that extends outwardly from the first surface, and wherein a screw extends outwardly from the first surface and is positioned such that the ring surrounds a first end of the screw; providing a bending module comprising a base and a second flange; where a coil spring extends between the base and the second flange; connecting the first flange to the second flange; and rotating the screw into the ground until the first flange contacts an upper surface of the ground.

In a further aspect, the invention may provide a sign system for temporarily displaying signs, comprising a mounting assembly and a pole; wherein the mounting assembly comprises a flange having an upper surface and a lower surface; a base engaged with the upper surface and extending outwardly therefrom in a first direction; and a screw engaged with the lower surface of the flange and extending outwardly therefrom in a second direction, wherein the screw has a length defined from the lower surface of the flange to a tip of the screw; and wherein the flange is oriented at right angles to a longitudinal axis of the screw; and wherein the pole is engageable with the base.

BRIEF DESCRIPTION OF THE DRAWINGS

A sample embodiment of the disclosure is set forth in the following description, is shown in the drawings and is particular and distinctly pointed out and set forth in the appended claims.

Similar numbers refer to similar parts throughout the drawings.

DETAILED DESCRIPTION OF THE EMBODIMENT

The present disclosure relates to an apparatus and method for temporarily deploying an outdoor sign system 86 (FIG. 11) comprising a mounting assembly 10, a pole 81 and in many instances a display sign 85. Mounting assembly 10 may be installed into the ground up to a preset depth that avoids buried pipes and cables, as will be described hereafter. Pole 81 may be engaged with the installed mounting assembly 10 and held in a generally vertical orientation thereby. Finally, display sign 85 may be engaged with pole 81 to provide information to workers or other persons who encounter sign system 86.

Figure 8:
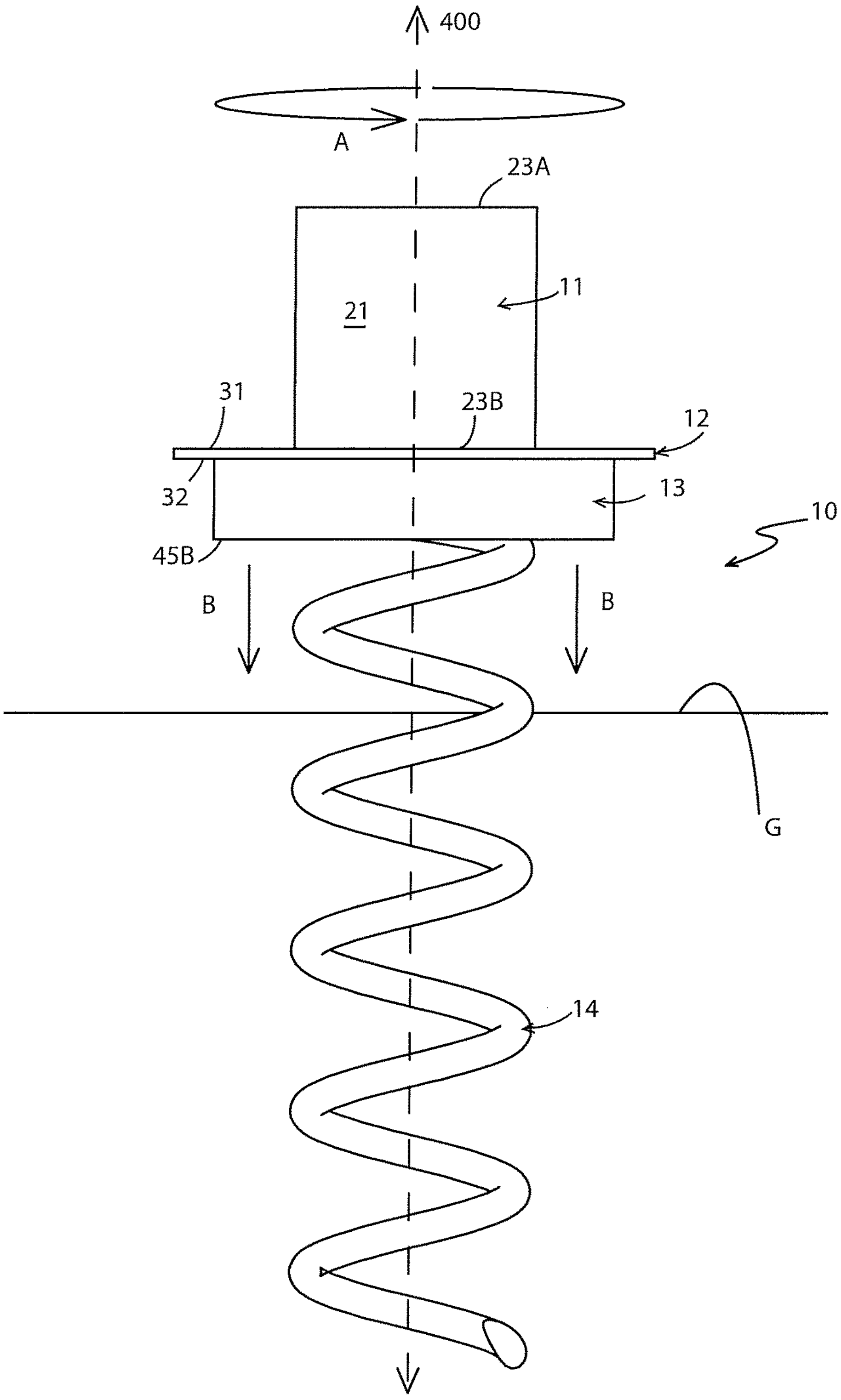
FIG. 8 is a side elevation view showing deployment of the mounting assembly into the ground.

Mounting assembly 10 comprises a base 11, a flange 12, a ring 13, and a screw 14. Screw 14 may comprise a helical coil that spirals around a longitudinal axis 400 (FIG. 8). The screw may be of a preset length and this preset length, together with the orientation of flange 12, may aid a user to install the mounting assembly 10 up to a certain depth only in the ground "G" (FIG. 8). The length of the screw 14 and the orientation of flange 12 may therefore aid in preventing damage to underground pipes or electric lines during installation of the mounting assembly 10. The ring 13 provides lateral stability to assembly 10 when mounting assembly 10 is installed in the ground. Ring 13 may be omitted from mounting assembly 10 in some instances. Mounting assembly 10 may be fabricated out of metal or some other strong durable material. Base 11, flange 12, ring 13 and screw 14 may be individually fabricated and then secured together by welding or some other suitable securement process. In other instances, mounting assembly 10 may be formed as a single, unitary, monolithic component.

Figure 3:
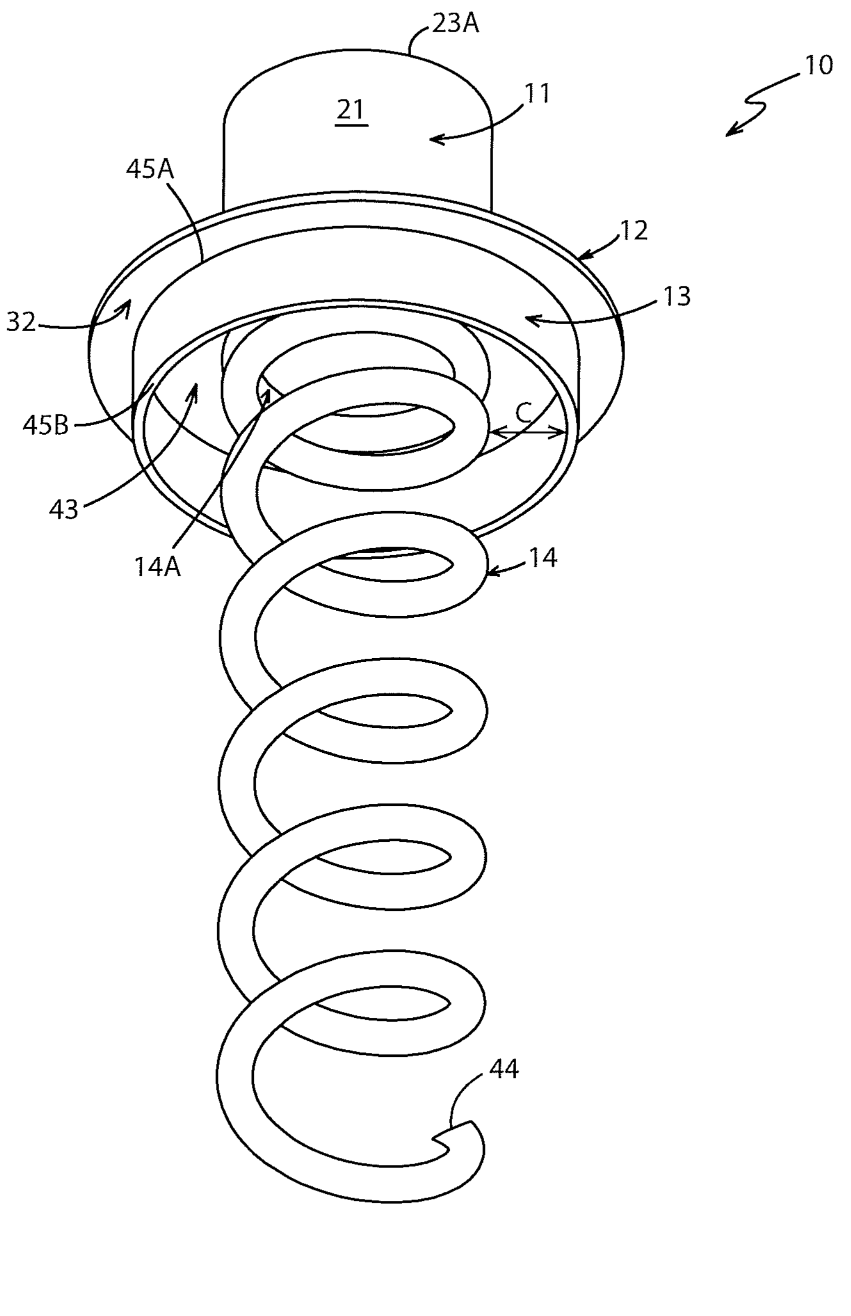
FIG. 3 is a bottom perspective view of the mounting assembly.

Base 11 may be a tubular member that comprises a wall having an outer surface 21, an inner surface 22, a top edge 23A, and a bottom edge 23B. Inner surface 22 of the wall of base 11 bounds and defines a first space 24. Flange 12 may be generally circular and have an upper surface 31 and a bottom surface 32. When viewed from the top (such as in FIG. 4, a region of flange 12 forms an annular surface that extends outwardly beyond outer surface 21 of base 11. Bottom edge 23B of base 11 may be engaged with the upper surface 31 of the flange 12 such that base 11 extends outwardly from upper surface 31 of flange 12 and generally at right angles thereto. The ring 13 has an outer surface 41, an inner surface 42, a top edge 45A, and a bottom edge 45B (as shown in FIG. 3) where top edge 45A is adjacent flange 12 and bottom edge 45B is remote from flange 12 and base 11. Top edge 45A may be engaged with bottom surface 32 of the flange 12 such that ring extends outwardly from bottom surface 32 generally at right angles thereto. The wall of base 11 may therefore be oriented generally parallel to ring 13. The inner surface 42 of the ring 13 defines a second space 43. Ring 13 surrounds an upper end 14A of screw 14 that engages bottom surface 32 of flange 12. The inner surface of ring 13 is separated from screw 14 by an annular gap "C" (FIG. 3). When mounting assembly 10 is installed in the ground "G" as will be described later herein, a quantity of soil will be located in the annular gap "C' around an exterior of the screw's coil and an additional quantity of soil will be located between the spirals of the coil.

Figure 2:
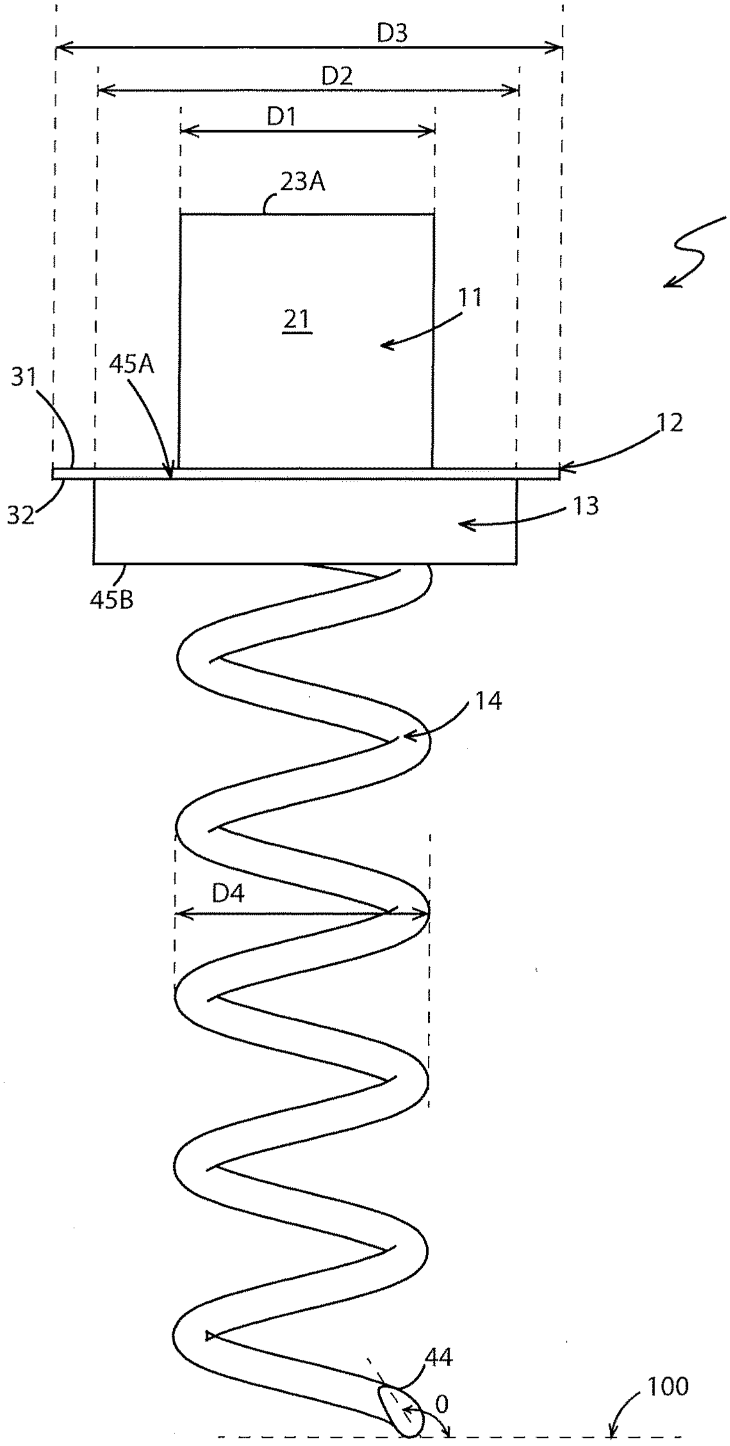
FIG. 2 is a side elevation view of the mounting assembly.

As depicted in FIG. 2, base 11 may be of a diameter D1; flange 12 may be of a diameter D2. Diameter D2 is greater than D1. Furthermore, a diameter of the ring 13 is defined as D3. D3 is smaller than D2, but is greater than D1. Lastly, a diameter of the screw 14 is defined as D4. D4 is smaller than D3 and D2, but may be the same as D1. A region 32A of the bottom surface 32 extends outwardly beyond the outer surface 41 of the ring 13. Ring 13 thus is spaced a distance outwardly from screw 14 and ring 13 surrounds an upper end of screw 14.

An upper end of screw 14 is engaged with bottom surface 32 of flange 12 and is located inside of the second space 43. As depicted in FIG. 2, the screw 14 further has an end tip 44 that is spaced a distance from bottom surface 32. The end tip 44 is oriented at an angle Θ to an imaginary horizontal line 100 that is oriented parallel to bottom surface 32 of flange 12. Preferably, the angle Θ is oriented at about 100° up to about 120° relative to line 100. This angle Θ may provide a good slope for penetration of the screw 14 into the ground. It will be understood that the angle Θ of the tip 44 may be of a different angle that what is stated above.

Figure 4:
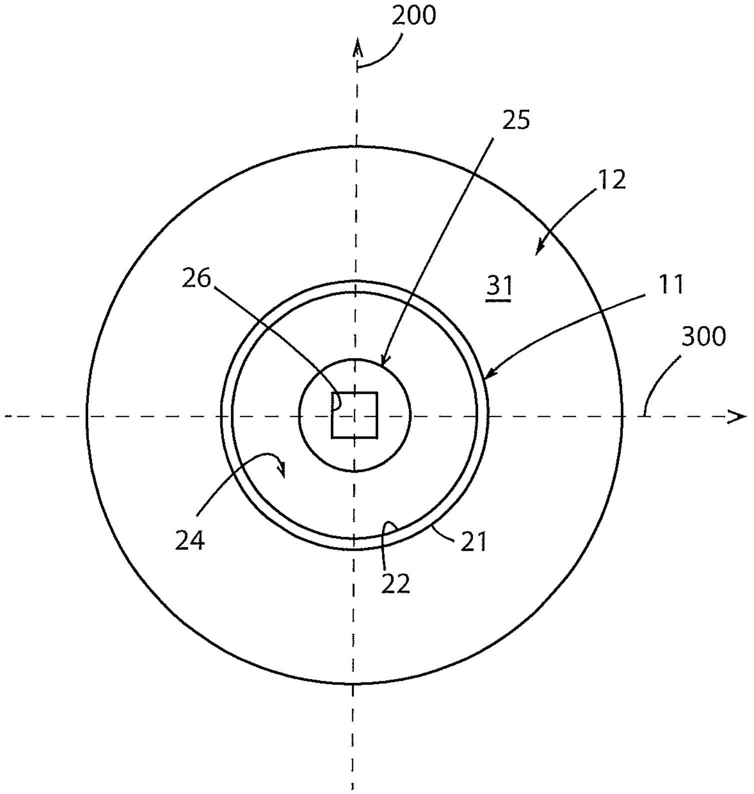
FIG. 4 is a top plan view of mounting assembly.

A top view of the mounting assembly 10 is depicted in FIG. 4. The base 11 may further comprise a drive assembly 25 that is located generally centrally within space 24 of base 11. The drive assembly 25 may be a ratchet drive assembly that is located at an intersection of a transverse axis 200 and a lateral axis 300. Drive assembly 25 may comprise a tubular wall that extends outwardly from upper surface 31 of flange 12. Drive assembly 24 may defines a space 26 therein that is square and is configured to be complementary to an end of a ratchet connector 52 that may be inserted into space 26 to rotate mounting assembly 10, as will be described later herein.

Figure 5:
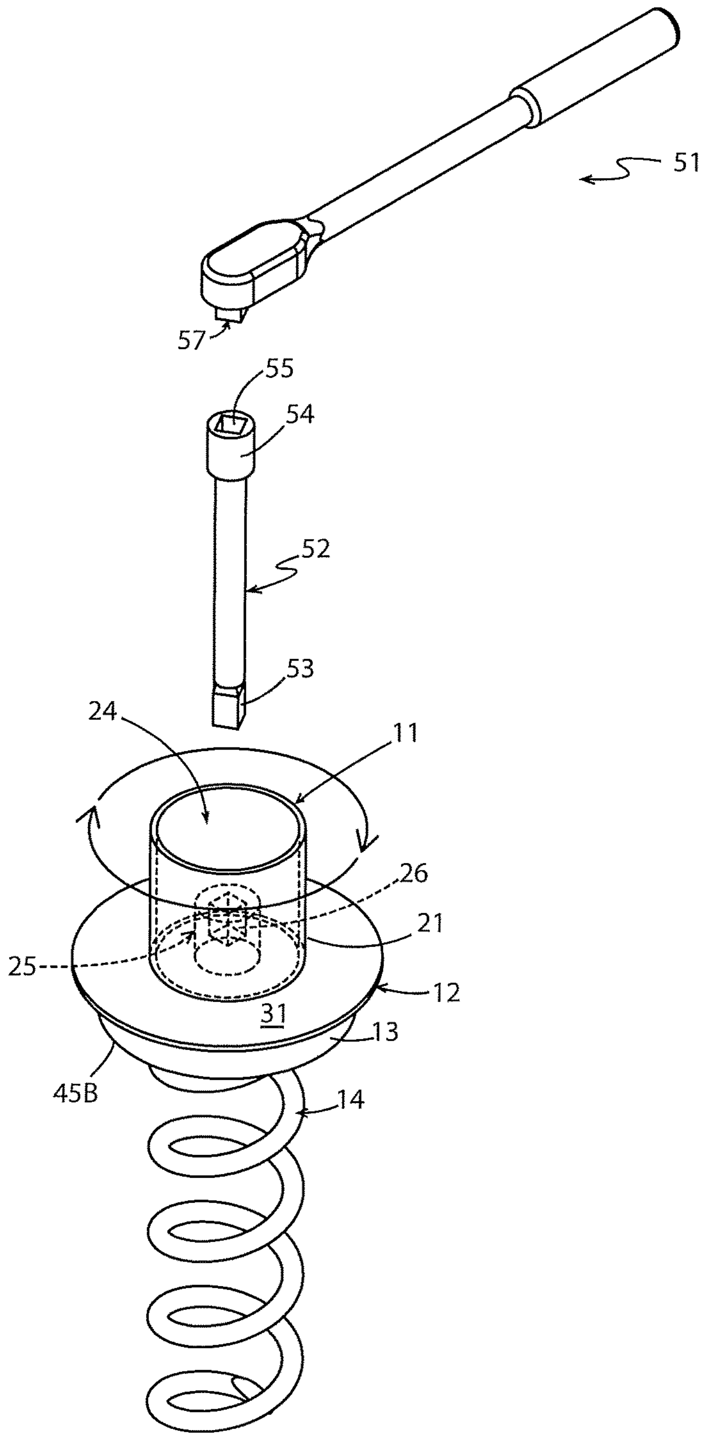
FIG. 5 is a top perspective view of the mounting assembly showing a ratchet and a ratchet connector positioned for installation of the mounting assembly into a ground surface.

As shown in FIG. 5, drive assembly 25 extends upwardly from the upper surface 31 of the flange 12 and into the first space 24. Ratchet connector 52 has a first end 53 and a second end 54. The first end 53 of ratchet connector 52 is shaped complementary to the inner space 26. The second end 54 of connector defines a square space 55 that is complementary to a protrusion 57 of a ratchet 51. The ratchet connector 52 may be used to engage the ratchet 51 with the mounting assembly. The ratchet 51 may then be used to rotate the mounting assembly 10 in a first direction to install the mounting assembly 10 into the ground and in a second direction to withdraw the previously installed mounting assembly from the ground.

Figure 6:
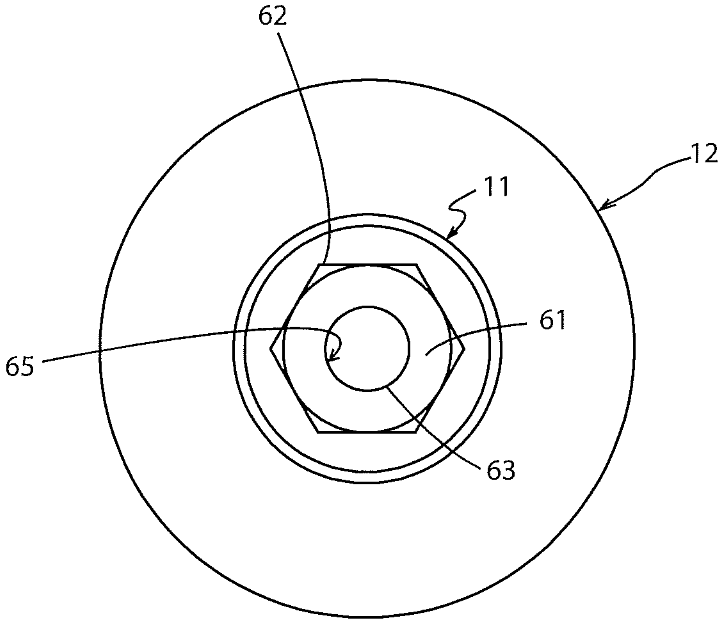
FIG. 6 is a top plan view of a second embodiment of the mounting assembly.
Figure 7:
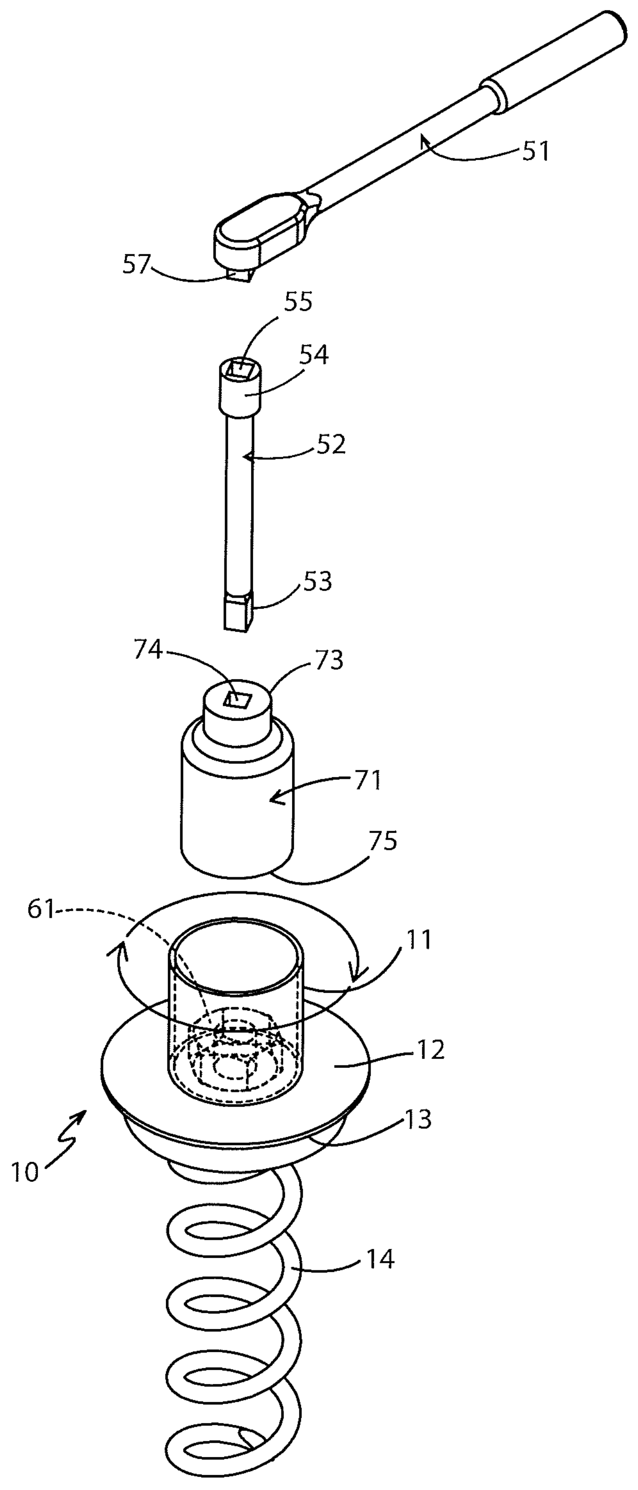
FIG. 7 is a top perspective view of the mounting assembly of FIG. 6 showing a ratchet, a ratchet connector and a socket connector positioned for installation of the mounting assembly into the ground.

An alternative embodiment of a driver assembly on mounting assembly 10 is shown in FIG. 6 and FIG. 7. Unlike the first embodiment, a differently shaped drive assembly 61 is provided within base 11. In this second embodiment, drive assembly 61 has a hexagonally shaped exterior surface 62 that defines an inner space 65. Drive assembly 61 is engaged with upper surface 31 of flange 12 and extends upwardly into space 24 defined by base 11. In addition to ratchet 51 and the ratchet connector 52, a socket 71 is provided to engage the drive assembly 61. The socket 71 includes a first end 73 that defines a square hole 74 which is complementary to the bottom end 53 of the ratchet connector 52. Although it is not shown in FIG. 7, it will be understood that a bottom end 75 of the socket 71 defines a hexagonally shaped recess therein that is complementary to the hexagonally shaped drive assembly 61. Socket 71 may be engaged with drive assembly 61, ratchet connector 52 is engaged with socket 71 and ratchet 51 is engaged with ratchet connector 52. Ratchet 51 may be used to rotate mounting assembly 10 in the first direction to install assembly 10 in the ground and in the second direction to remove assembly 10 from the ground.

FIG. 8 depicts how the mounting assembly 10 penetrates into the ground "G". As indicated by a rotational arrow A, the mounting assembly 10 is rotated in a first direction about a longitudinal axis 400 of screw 14 (by the ratchet 51). It should be noted that flange 12 is oriented substantially at right angles to longitudinal axis 400 of screw 14. It will be understood that ratchet 51 does not need to be used to rotate mounting assembly 10 but using the tool does make it easier to rotate assembly 10, particularly if the ground "G" is hard. Any other tool, such as a wrench, may be used for this purpose.

As the ratchet 51 rotates the mounting assembly 10 around the longitudinal axis 400, the tip 44 of the screw 14 begins to cut into the ground "G". Continued rotation of assembly 10 causes the screw to wind into the ground "G" thus moving ring 13 and flange 12 downwardly in the direction indicated by arrow "B". The rotation and downward movement of the mounting assembly 10 continues until bottom edge 45B of the ring 13 and then ring 13 itself cuts into the ground "G" Continued rotation and downwardly movement of mounting assembly 10 will eventually bring bottom surface 32B of flange 12 into contact with ground "G". As the bottom surface 32B of flange 12 contacts the ground, the downward movement "B" of the mounting assembly 10 is caused to substantially stop. When this occurs, the installer knows that mounting assembly 10 has been inserted into ground "G" to the maximum depth.

Figure 9:
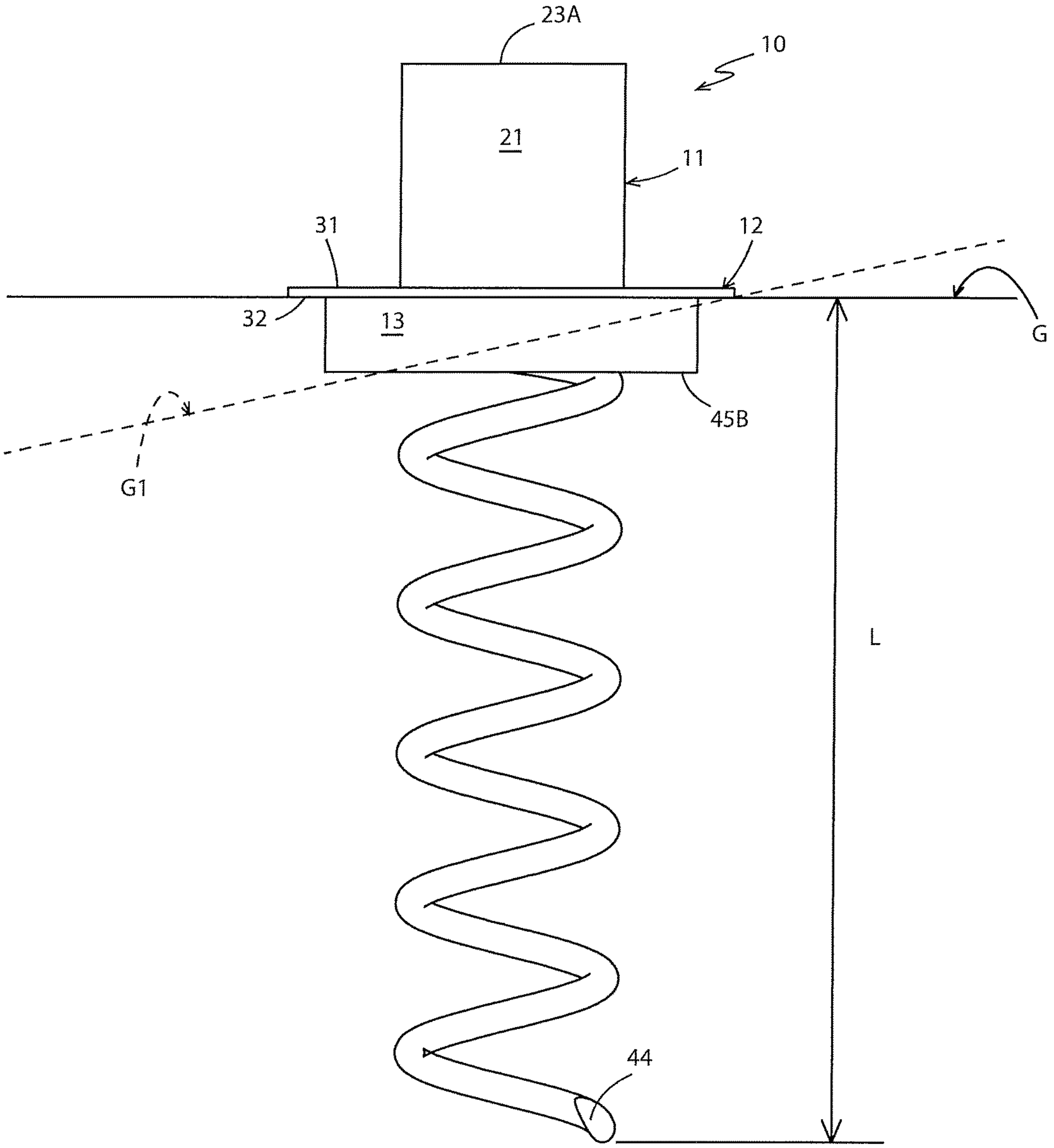
FIG. 9 is a side elevation view of the mounting assembly deployed in the ground and showing a tilted ground surface in phantom.

As depicted in FIG. 9, penetration depth of the mounting assembly 10 is controlled by flange 12 and a present length "L" of the screw 14. The length "L" of the screw 14 is measured from the bottom surface 32 of the flange 12 to the tip 44 of the screw 14. In one embodiment, the length "L" of the screw 14 is up to about 12 inches long. Consequently, the penetration depth of the mounting assembly 10 is also up to about 12 inches. In oil and gas fields, for example, pipes and cables are typically laid at around 15 inches beneath the surface of the ground "G". Thus, a penetration depth of 12 inches is more than sufficient to anchor a pole or sign in ground "G" but is well clear of the laid pipes and cables.

It will be understood that if a different penetration depth is required, the length of the screw 14 provided on mounting assembly 10 may be changed accordingly.

FIG. 9 also shows that mounting assembly 10 may be installed in a horizontal ground surface "G" or in a tilted ground surface "G1". As is evident from this figure, mounting assembly 10 may be deployed into angled ground "G1" to a maximum present depth because at least a portion of flange 12 and the ring 13 will contact that angled ground surface "G1" and thereby tend to ensure that the screw 14 does not cut into the ground beyond the desired preset depth.

Figure 10:
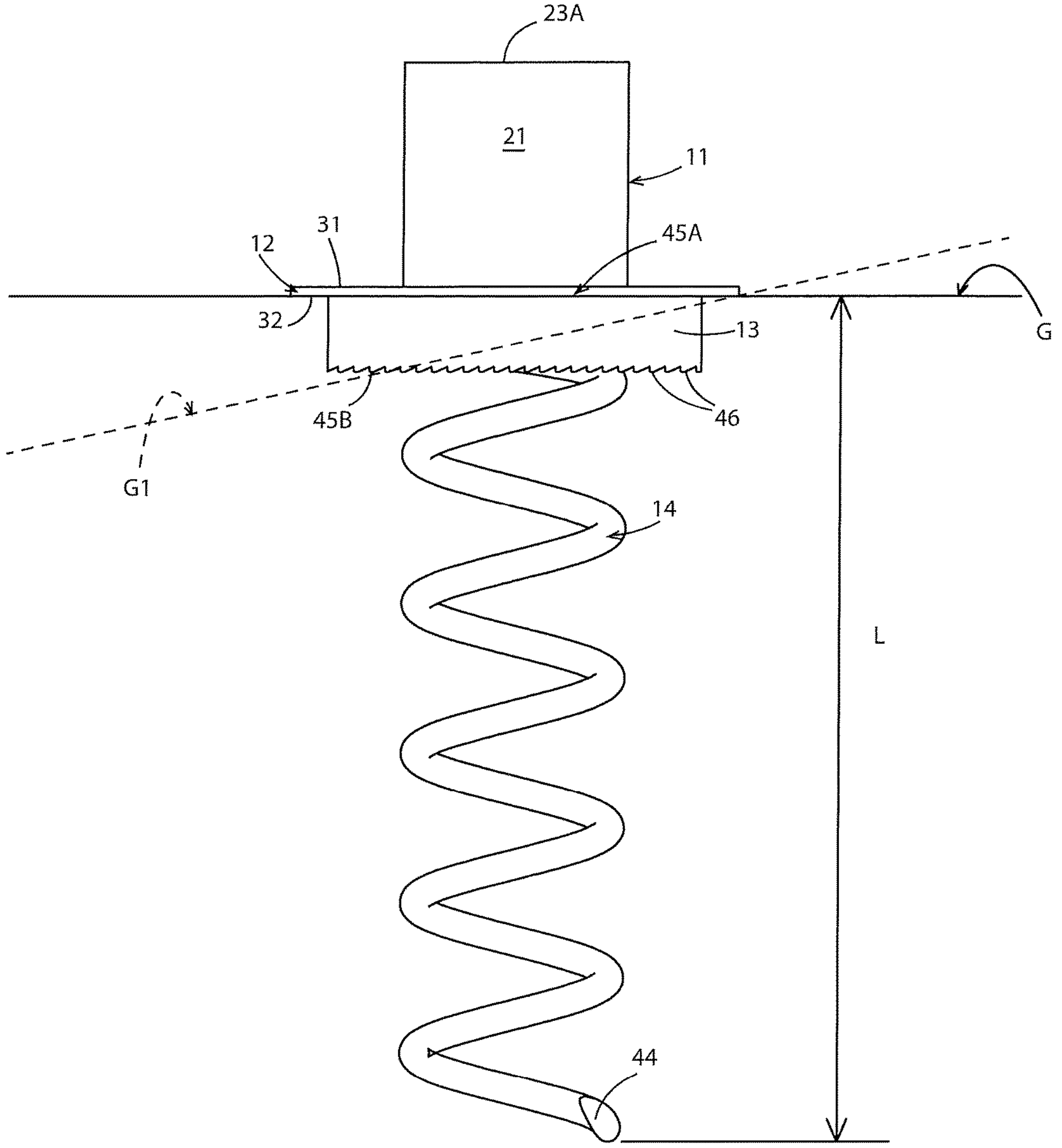
FIG. 10 is a side elevation view of a third embodiment of the mounting assembly having a serrated ring and showing the mounting assembly deployed in the ground.

In a third embodiment, as shown in FIG. 10, the ring 13 may be provided with serrations 46 on the bottom edge 45B thereof. The serrations 46 on the bottom edge 45B of the ring 13 may help penetration of the mounting assembly 10 into the ground as the serrations 46 will aid into cutting into ground "G" or angle ground "G1". It will be understood that serrations 46 may take any of a number of different shapes and configurations including but not limited to serrated teeth or undulations.

Figure 11:
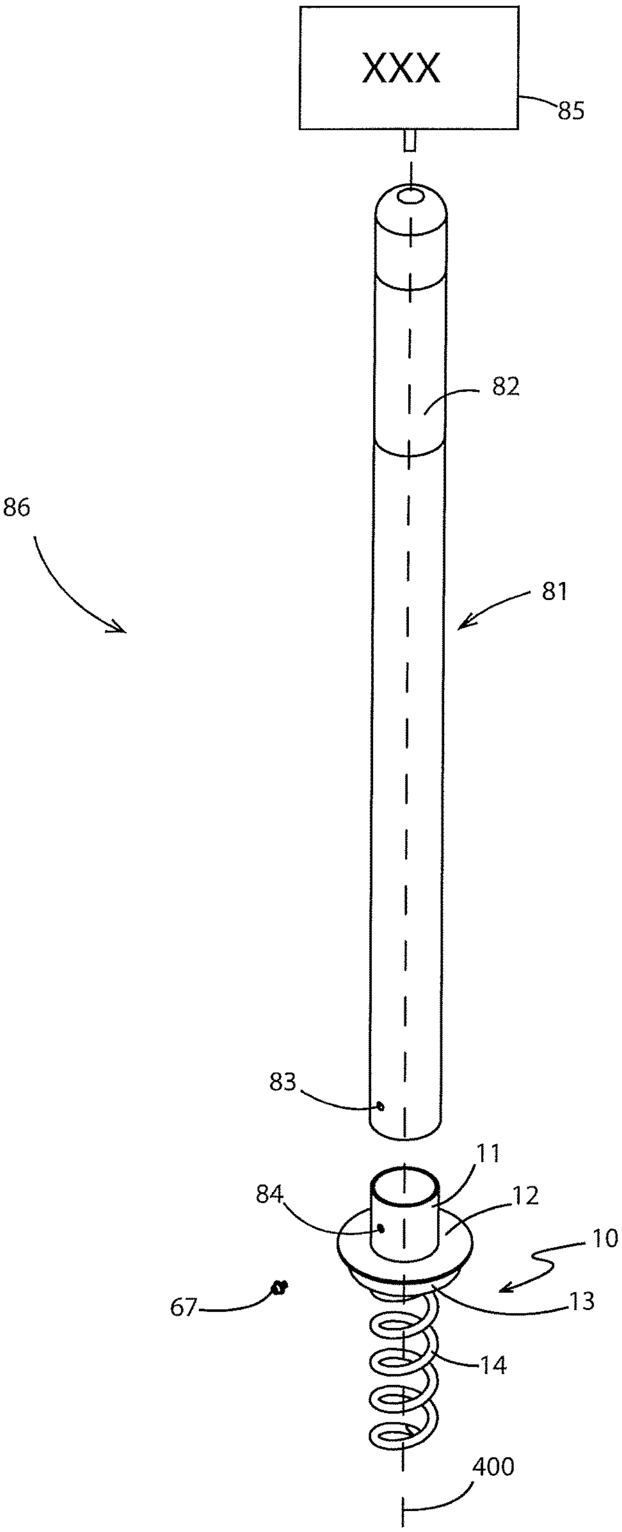
FIG. 11 is an exploded top perspective view of the sign system showing the mounting assembly, a pole, a connecting pin and a display sign for engagement with the pole.
Figure 12:
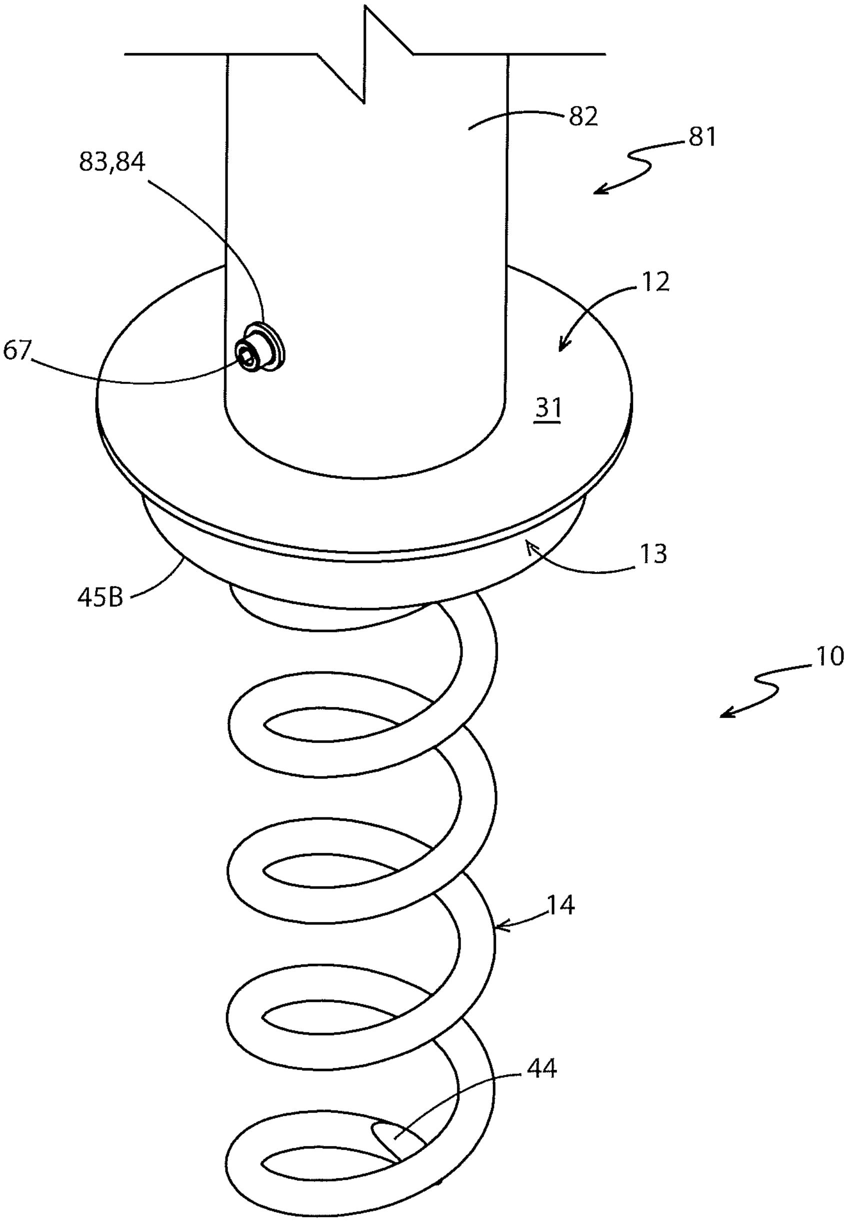
FIG. 12 is a partial enlarged view of the sign system of FIG. 11 showing a bottom end of the pole secured to the mounting assembly using the connecting pin.

As depicted in FIG. 11 and FIG. 12, after or before deploying the mounting assembly 10 into ground, a pole 81 may be attached to the base 11 of the mounting assembly 10. The pole 81 includes a shaft 82 that define a first set of one or more holes 83 proximate a bottom end of shaft 82. The wall of base 11 may define a second set of one or more holes 84 therein. The shaft 82 of the pole 81 may be engaged with base and then rotated until the one or more holes 83 align with the one or more holes 84. A screw or connector pin 67 may be inserted through each group of aligned holes 83, 84 to secure the pole 81 to the mounting assembly 10. A sign 85 containing information thereon may be attached to the top of pole 81. The mounting assembly 10, the pole 81, and the sign 85 make up a sign system 86 in accordance with the present disclosure.

It will be understood that while the pole 81 is shown and described as fitting around an exterior of the base 11, pole 82 could instead be received in the first space 24 of base 11.

Figure 13:
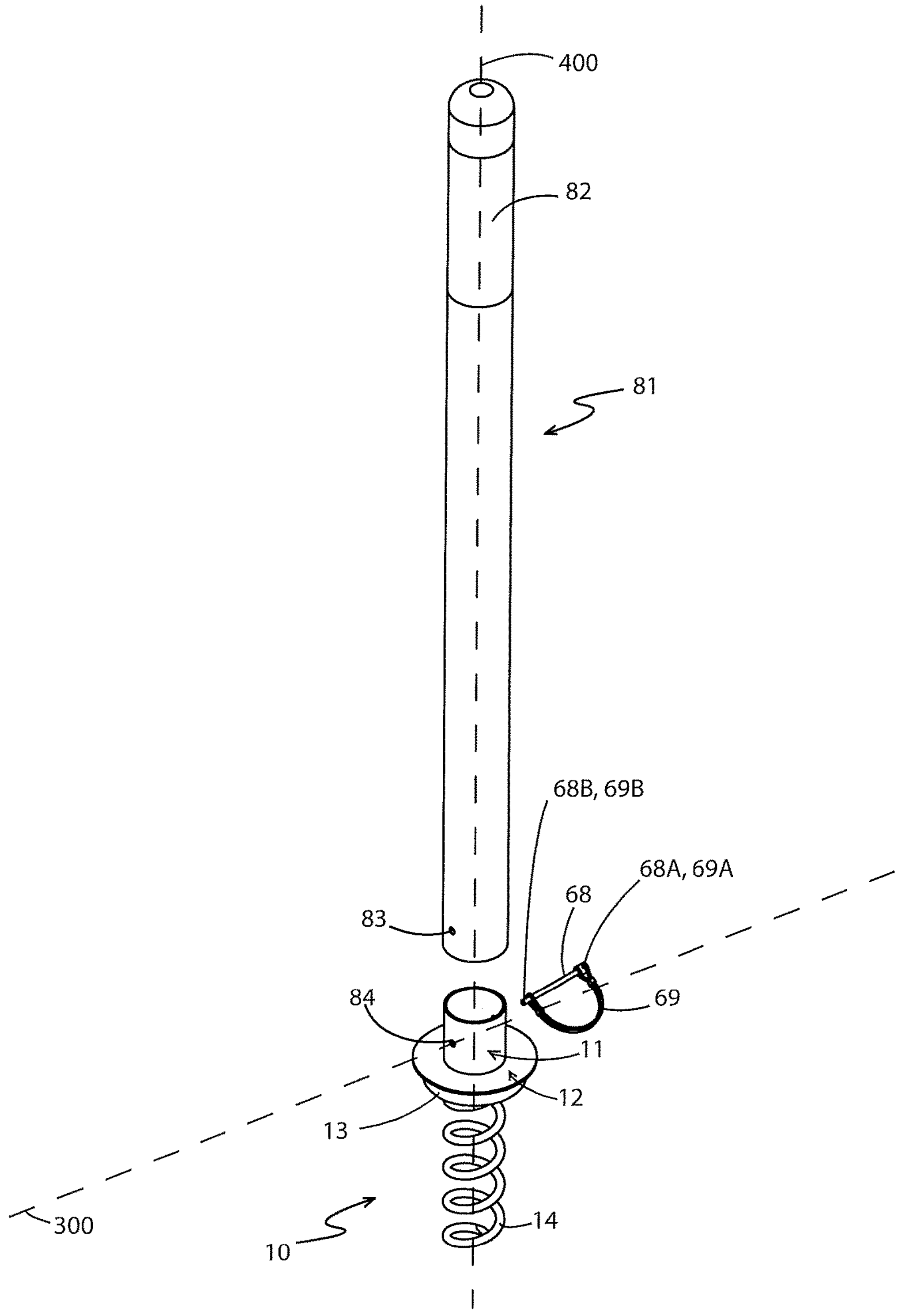
FIG. 13 is an exploded top perspective view of a sign system in accordance with the present disclosure showing the mounting assembly with a pole and a clevis pin.
Figure 14:
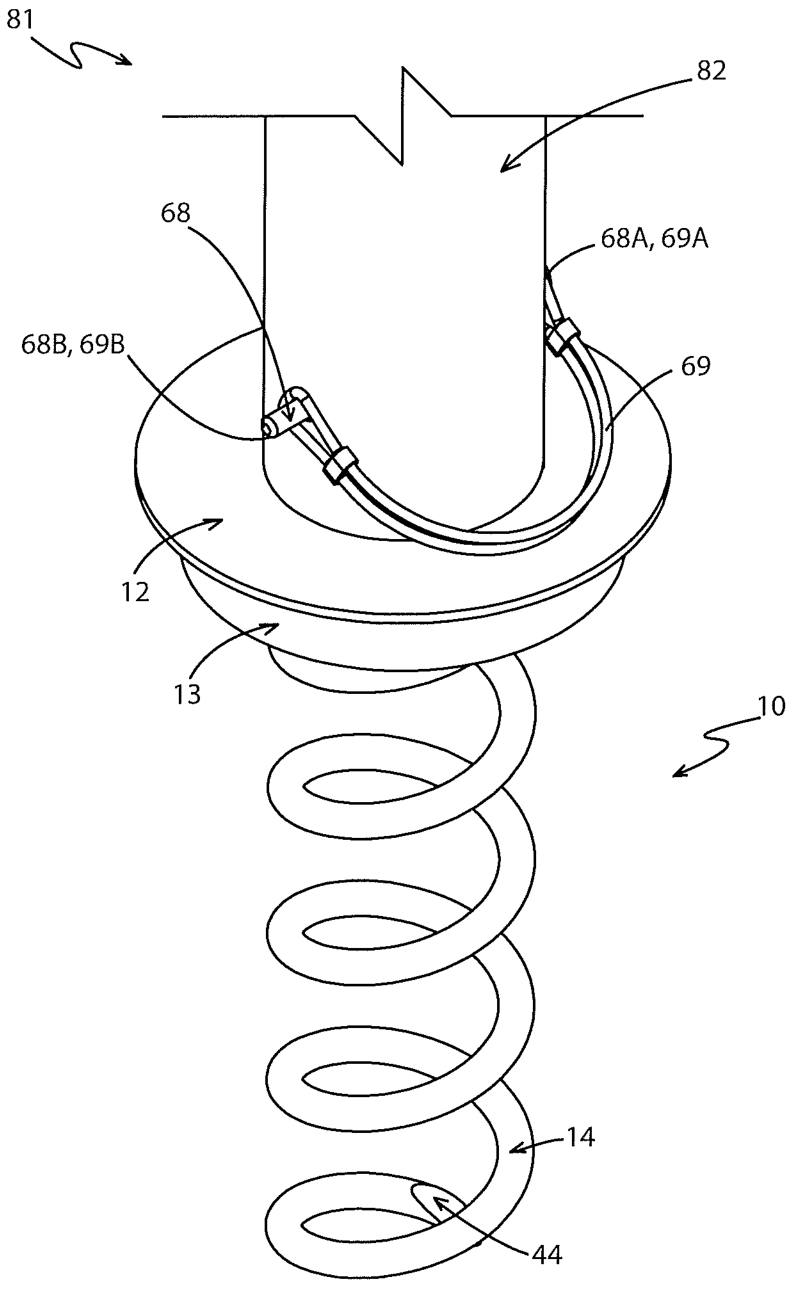
FIG. 14 is an enlarged view of the sign system of FIG. 13 showing the pole secured to the mounting assembly by the clevis pin.

As shown in FIG. 13 and FIG. 14, a clevis pin 68 may replace the screw or connector pin 67 to connect the pole 81 to the mounting assembly 10. The clevis pin 68 may comprise a first end 68A, a second end 68B, and a strap 69. The strap 69 comprises a fixed end 69A and a movable end 69B. The fixed end 69A of the strap 69 is engaged with the first end 68A of the pin 68, and the movable end 69B of the strap 69 is movably attached to the second end 68B of the pin 68. After the shaft 82 of pole 81 and the mounting assembly 10 are aligned along the vertical axis 400, the pole 81 is inserted around the outer surface 21 of the hollow base 11. The first set of holes 83 in the pole 81 are aligned with the second set of holes 84. Then, the clevis pin 68 is inserted through the aligned holes 83, 84. Lastly, the movable end 69B of the strap 69 is snuggly connected to the second end 68B of the pin 68 so that the pin 68 secures the pole 81 and the mounting assembly 10 together.

Figure 1:
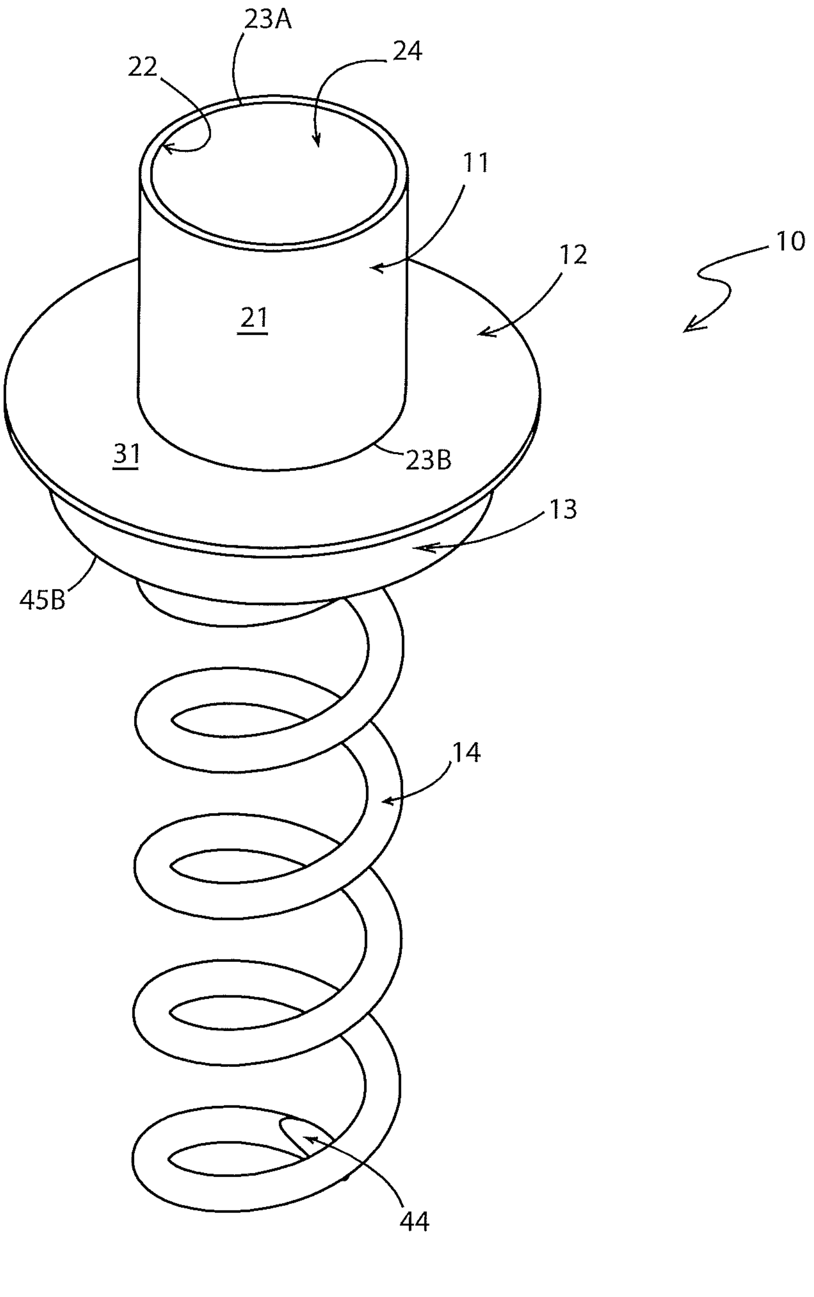
FIG. 1 is a top perspective view of a first embodiment of a mounting assembly for a sign system in accordance with the present disclosure.
Figure 15:
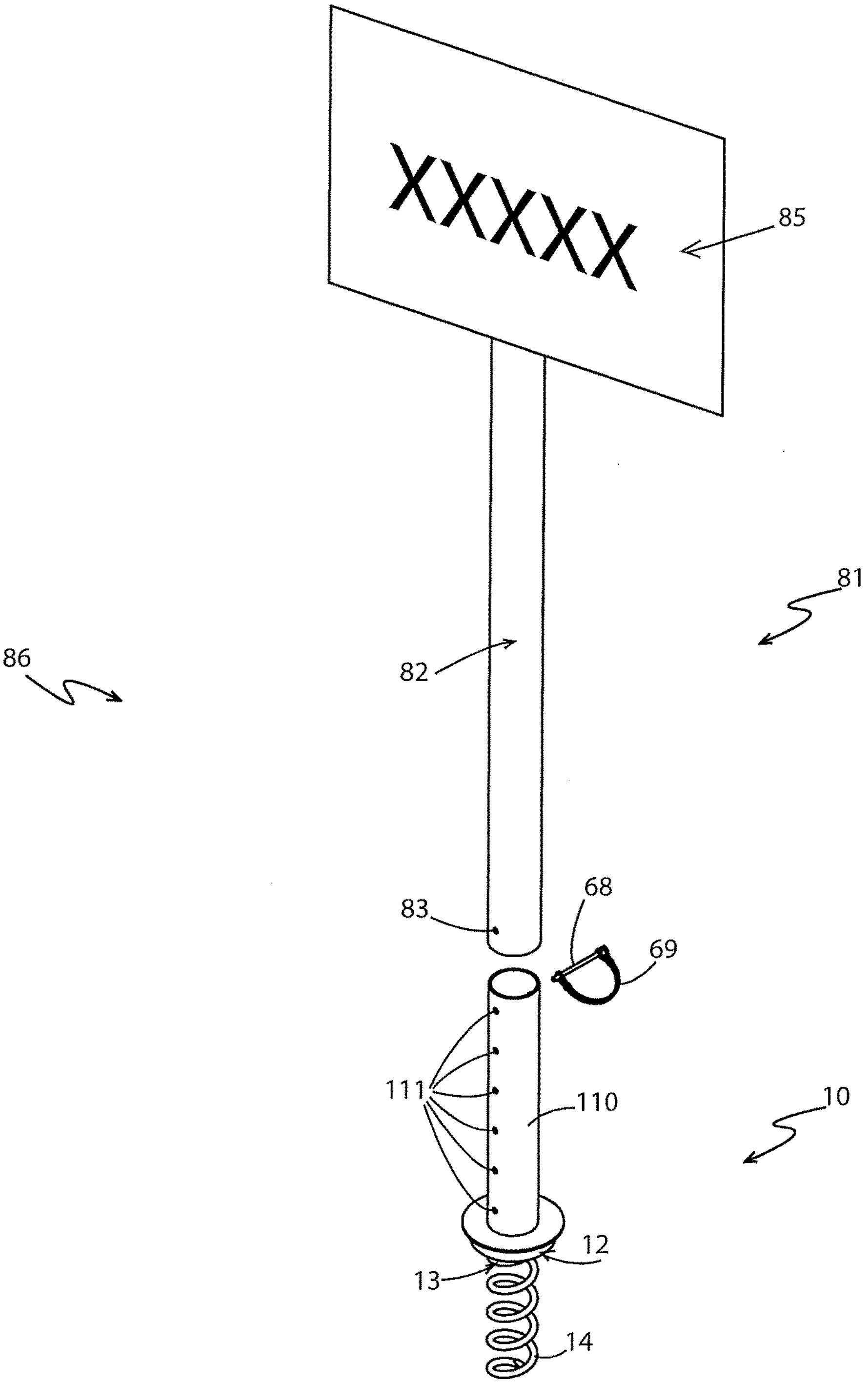
FIG. 15 is an exploded top perspective view of the sign system showing a fourth embodiment of the mounting assembly with a pole that has an information sign mounted thereof and a clevis pin.

In a fourth embodiment, as depicted in FIG. 15, the mounting assembly 10 may have a base 110 that is longer than the base 11 show in FIG. 1. Base 110 defines a plurality of vertically spaced holes or pairs of holes 111 therein. The pole 81 can be telescopically mounted on the mounting assembly 10 using the clevis pin 68. The user may select different holes 111 to set pole 81 at a different height relative to the ground "G" or "G1". Any type of connector other than the illustrated clevis pin 68 may be used to secure pole 81 to base 110.

Figure 16:
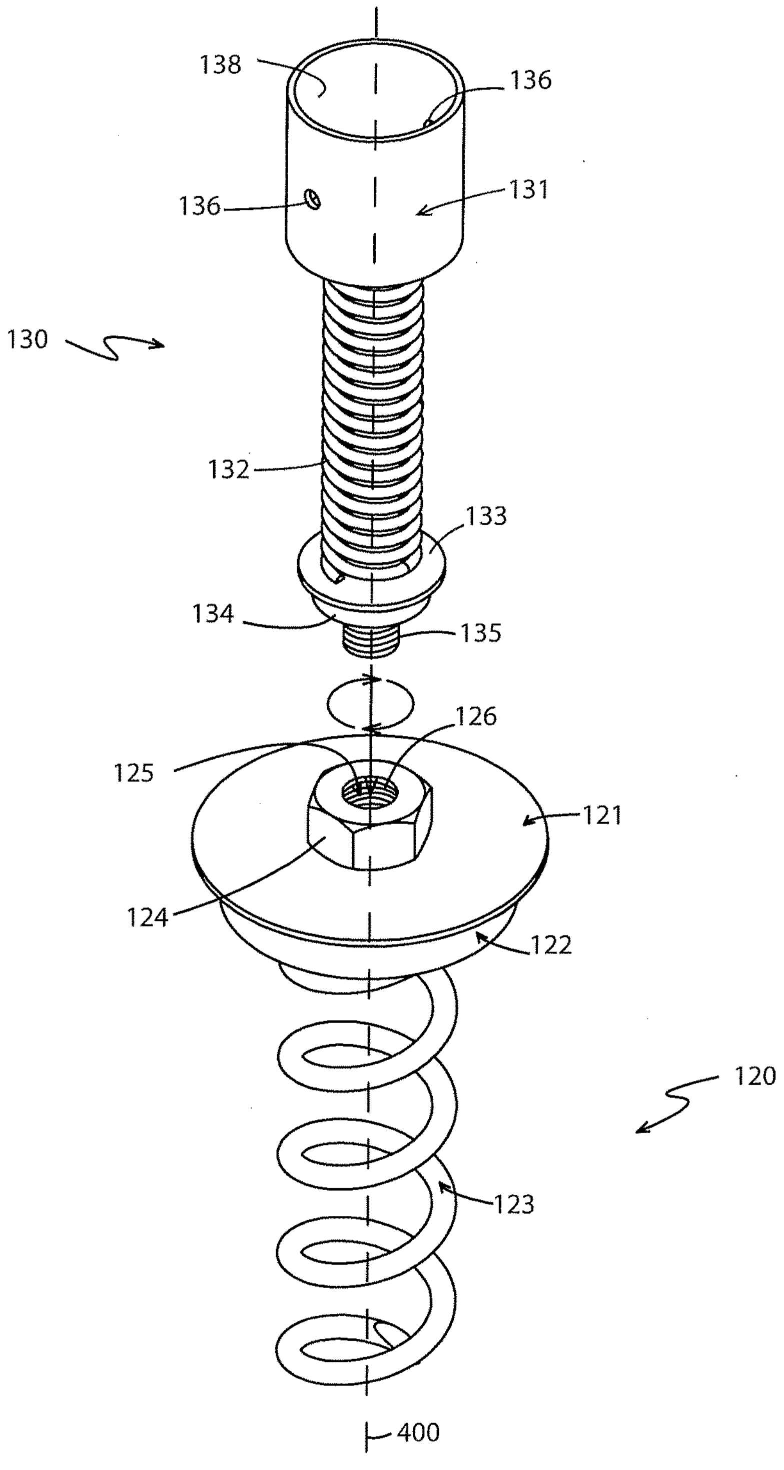
FIG. 16 is a top perspective view of a fifth embodiment of the mounting assembly and showing a bending module of the mounting assembly exploded away from the flange thereof.

In a fifth embodiment, as depicted in FIG. 16, mounting assembly 120 may include a bending module 130. In this instance, the mounting assembly 120 comprises a flange 121, a ring 122, a screw 123, and a threaded hexagonal nut 124 that is provided on an upper surface of flange 121. Nut 124 defines a cylindrical hole 125 that is threaded with threads 126 and nut 124 may be welded on the upper surface of the flange 121. The first ring 122 is engaged with the lower surface of the first flange 122. The screw 123 is fixedly connected with the lower surface of flange 122, and the ring 122 surrounds the upper end of the screw 123.

The bending module 130 may comprise a base 131, a coil spring 132, a second flange 133, a second ring 134, and a threaded end 135. One end of the coil spring 132 may be welded to the bottom of the base 131. The other end of the coil spring 132 may be welded to the second flange 133. The coil spring 132 allows the base 131 to bend and move relative to the second flange 133. The base 131 defines one or more holes 136 therein. The base 131 further defines a space 138 inside of the base 131 to receive a pole 81 therein. Nut 124 may be engaged aby a socket 71 (shown in FIG. 7) and a ratchet 51 to rotate screw 123 into the ground. A center of the bending module 130 may be aligned with the hole 125 in the nut 124 along the vertical axis 400. The threaded end 135 of the bending module 130 may be inserted into the cylindrical hole 125 and rotated to connect the bending module 130 to the mounting assembly 10.

Figure 17:
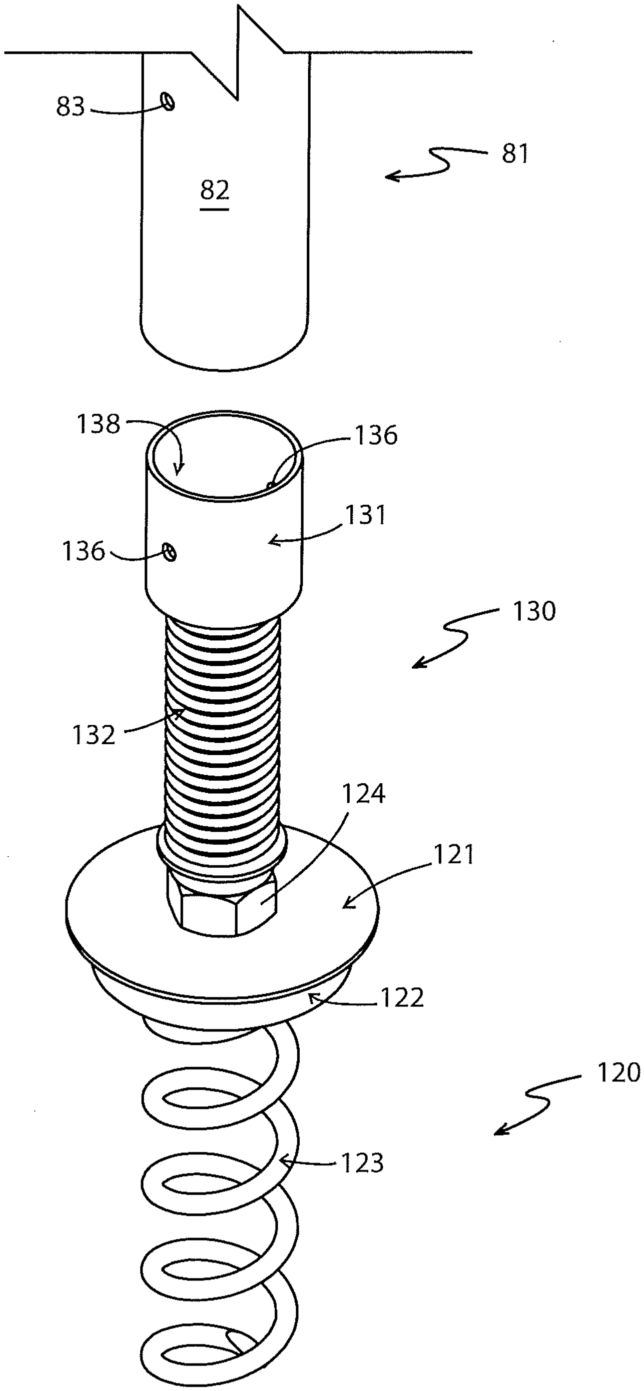
FIG. 17 is a partially exploded top perspective view of a sign system including the mounting assembly of FIG. 16.
Figure 18:
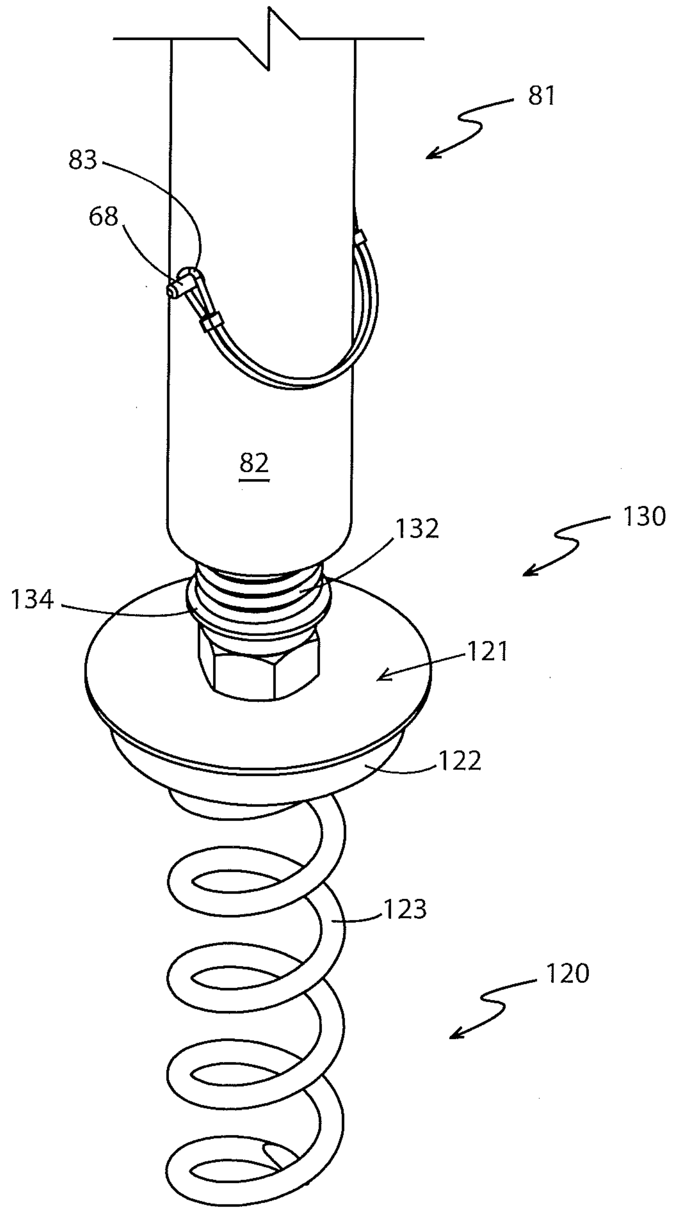
FIG. 18 is an enlarged view of the sign system of FIG. 17 showing the pole connected to the bending module of the mounting assembly.
Figure 19:
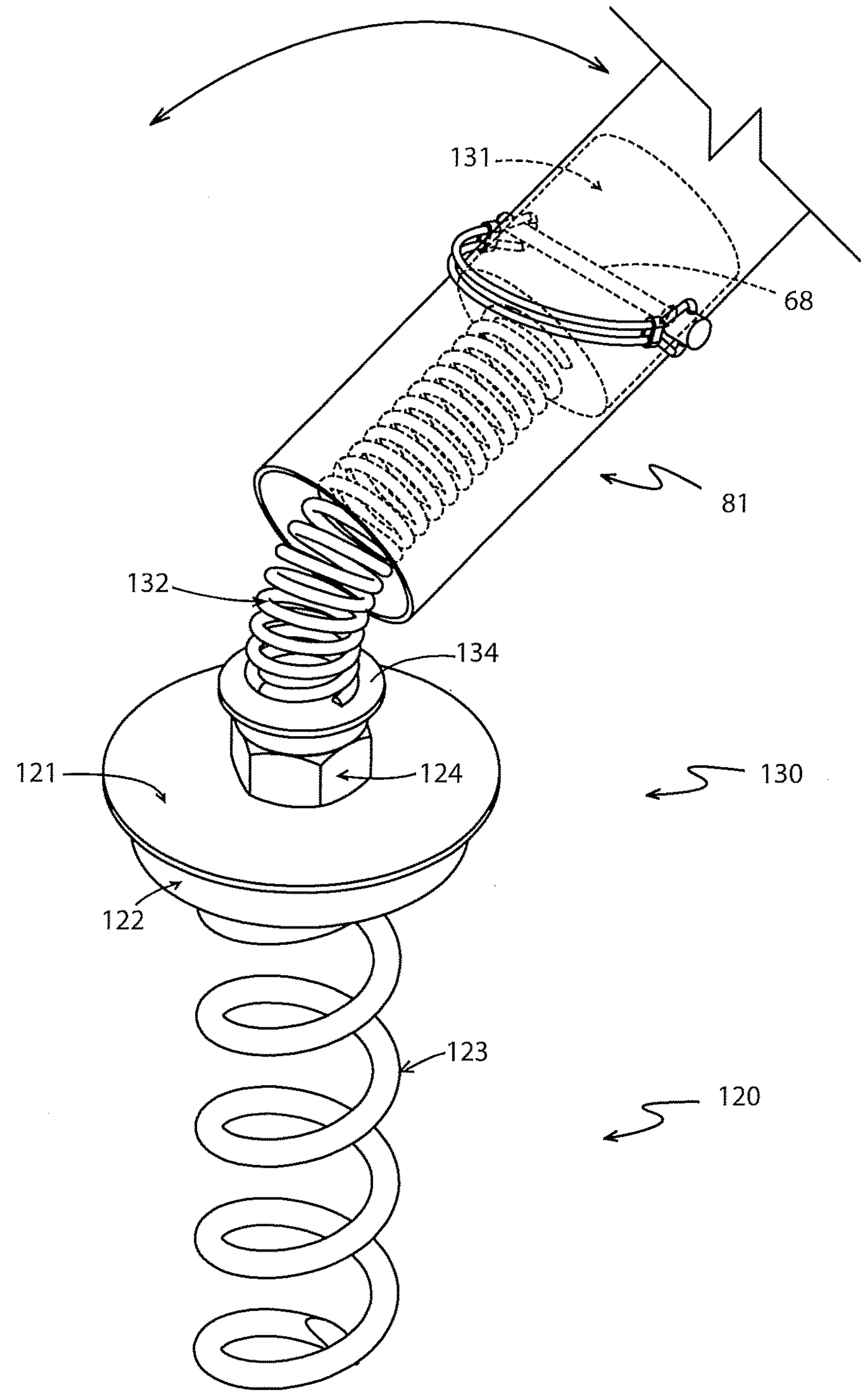
FIG. 19 is a top perspective view of the sign system showing the bending module in a bent condition.

As depicted in FIG. 17 and FIG. 18, before or after the mounting assembly 120 is rotated into the ground in the similar way that is discussed above with respect to mounting assembly 10, a pole 81 may be engaged with the base 131 of the bending module 130 and then the hole(s) 83 of the pole 81 may be aligned with with the hole(s) 136 of the base 131. A clevis pin 68 or other connector may then be used to secure pole 81 to base 131. As further depicted in FIG. 19, bending module 130 is able to bend and flex back and forth as pole 81 and any sign thereon are blown about by wind or are contacted by machinery. Bending module 130 may thus aid in preventing any damage to the sign or pole.

The temporary sign system 86 can be used in the following manner. The mounting assembly 10 is screwed into the ground as previously stated. The pole 81 is engaged with the mounting assembly 10 and secured thereto by connectors. The sign 85 is selectively engaged with the pole 81 if required and sign system 86 may be used at that temporary location for a period of time. When the sign system 86 is no longer required at that particular location, the mounting assembly 10 may be removed by rotating the mounting assembly 10 in a second direction that withdraws assembly 10 from the ground "G". The sign system 86 may then be installed in another new location as required.

It will be understood that base 11 may be fabricated to be substantially solid instead of being tubular in construction and that hole 83 may penetrate through this solid base 11.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

What is claimed:

1. A mounting assembly for quickly deploying signs in a region of ground comprising:

a flange having an upper surface and a lower surface;

a base engaged with the upper surface and extending outwardly therefrom in a first direction;

a screw integral with the flange and extending downwardly from the lower surface of the flange and extending outwardly therefrom in a second direction, wherein the screw has a length defined from the lower surface of the flange to a tip of the screw; and an annular ring that extends downwardly from the lower surface of the flange; wherein the flange has an outer circumferential edge and the ring is located a distance inwardly from the outer circumferential edge of the flange.

2. The mounting assembly as defined in claim 1, wherein the screw is a helical coil that winds around a longitudinal axis; and wherein the flange is oriented at right angles to the longitudinal axis.

3. The mounting assembly in claim 1, further comprising a drive assembly provided on the upper surface of the flange, said drive assembly being surrounded by a wall of the base.

4. The mounting assembly in claim 3, wherein the drive assembly is a ratchet drive assembly that extends upwardly from an upper surface of the flange and is adapted to receive a portion of a ratchet connector therein.

5. The mounting assembly in claim 1, wherein a diameter of the flange is greater than a diameter of the screw.

6. The mounting assembly in claim 1, wherein the ring surrounds an upper end of the screw and is spaced a distance outwardly from the upper end of the screw.

7. The mounting assembly in claim 6, wherein a diameter of the ring is greater than a diameter of the base.

8. The mounting assembly in claim 6, wherein a diameter of the screw is smaller than a diameter of the ring.

9. A method of deploying a sign system into a region of ground, comprising:

providing a sign system for temporarily displaying signs wherein the sign system comprises a mounting assembly and a pole; wherein the mounting assembly comprises: a flange having an upper surface and a lower surface; a base engaged with the upper surface and extending outwardly therefrom in a first direction; and a screw engaged with the lower surface of the flange and extending outwardly therefrom in a second direction, wherein the screw has a length defined from the lower surface of the flange to a tip of the screw; and an annular ring that extends downwardly from the lower surface of the flange; wherein the flange has an outer circumferential edge and the ring is located a distance inwardly from the outer circumferential edge of the flange; and wherein the flange is oriented at right angles to a longitudinal axis of the screw;

engaging the pole with the base;

engaging a sign on the pole;

rotating the screw into the ground; and limiting a depth to which the screw rotates into the ground.

10. The method of claim 9, wherein the step of providing the mounting assembly comprises orienting the flange at right angles relative to a longitudinal axis of the screw; and the step of limiting the depth to which the screw rotates into the ground comprises contacting the ground with the flange.

11. The method of claim 9, wherein the step of providing the mounting assembly comprises providing the screw of a length that is about 12 inches when measured from the lower surface of the flange to a tip of the screw.

12. The method of claim 9, wherein the step of rotating the screw comprises:

engaging a driver assembly provided on the upper surface of the flange with a ratchet; and rotating the mounting assembly in a first direction using the ratchet.

13. The method of claim 9, wherein the step of providing the mounting assembly further comprises providing a ring that extends outwardly from the lower surface of the flange and surrounds a first end of the screw; wherein the ring is located a distance inwardly from an outer circumferential edge of the flange.

14. The method of claim 9, further comprising:

removing the mounting assembly from the ground after a period of time; and installing the mounting assembly at a new location.

15. The mounting assembly as defined in claim 1, wherein the screw is integral with the flange and extends downwardly from the lower surface of the flange.

16. The mounting assembly as defined in claim 1, wherein the flange is of a greater diameter than an outer diameter of the ring.

17. The mounting assembly as defined in claim 1, wherein an annular portion of the flange extends radially outwardly beyond the ring.

18. The method as defined in claim 9, wherein the step of providing the sign system includes providing the sign system wherein the screw is integral with the flange and extends downwardly from the lower surface of the flange.

19. The method as defined in claim 13, wherein the step of rotating the screw into the ground further comprises cutting into the ground with a bottom edge of the ring.

* * * * *